United States Patent
Yagi

(10) Patent No.: US 7,030,308 B2
(45) Date of Patent: Apr. 18, 2006

(54) SYNCHRONIZED BEAT NOTIFICATION SYSTEM AND MASTER DEVICE AND SLAVE DEVICE FOR USE THEREWITH

(75) Inventor: Shigeki Yagi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 161 days.

(21) Appl. No.: 10/655,843

(22) Filed: Sep. 5, 2003

(65) Prior Publication Data

US 2004/0079220 A1    Apr. 29, 2004

(30) Foreign Application Priority Data

Sep. 6, 2002   (JP)   ............................. 2002-261637

(51) Int. Cl.
*G09B 15/00* (2006.01)
(52) U.S. Cl. ...................................................... 84/484
(58) Field of Classification Search ................ 84/484
See application file for complete search history.

(56) References Cited

U.S. PATENT DOCUMENTS 3,595,122 A * 7/1971 Brediceanu ................... 84/484

2003/0167908 A1 * 9/2003 Nishitani et al. ............. 84/723

* cited by examiner

*Primary Examiner*—Jeffrey W Donels
(74) *Attorney, Agent, or Firm*—Adams & Wilks

(57) ABSTRACT

A synchronized beat notification system has a master device having a beat input unit and a master radio communication unit for transmitting as radio information a beat inputted to the beat input unit together with identification information corresponding to information identifying the master device. A slave device has a slave radio communication unit for receiving the radio information transmitted from the master radio communication unit and a beat notification unit for performing notification of the beat inputted to the beat input unit in accordance with the information received by the slave radio communication unit. The slave radio communication unit extracts from the received radio information the identification information corresponding to the master device and controls the beat notification unit to perform beat notification only when the extracted identification information coincides with identification information on a master device intended to become a communication partner with the slave device.

18 Claims, 5 Drawing Sheets

SKIN

REACTING PORTION

SYNCHRONIZED BEAT NOTIFICATION SYSTEM AND MASTER DEVICE AND SLAVE DEVICE FOR USE THEREWITH

BACKGROUND OF THE INVENTION

1. Field of the Invention

The present invention relates to a synchronized beat notification system for notifying a plurality of players who are playing in synchronization with a common rhythm, such as musicians in an ensemble, a marching band, or synchronized swimmers, of synchronized beats. The present invention also relates to a master device and a slave device for the synchronized beat notification system.

2. Description of the Related Art

There are occasions when a metronome is used by a plurality of players who are playing music or the like in synchronization with a common rhythm. The metronome enables notification of beats with a beat indicator stick performing a swinging movement, the flashing operation of an LED, a clicking sound, or the like. In relation to that, a method has also been proposed in which a tempo signal and a control signal indicative of the initiation timing for the generation of the tempo signal are transmitted to another communication apparatus via communication means, and a musical sound corresponding to the tempo signal is produced in the communication apparatus that has received the tempo signal and the control signal, to thereby notify a plurality of users at different locations of synchronized beats at a steady tempo (see, e.g., JP 2001-154672 A (pp. 5–6, FIGS. 1 to 5)).

However, the conventional metronome has the following problems to be solved:

(1) If visual notification using the beat indicator stick, the flashing operation of the LED, or the like is performed, it is difficult to place a single metronome within sight of every member of an ensemble consisting of a large number of musicians, a marching band composed of moving players, a synchronized swimming team, or the like.

(2) If a metronome is used in a dark environment or under the hot sun, there are cases where the user has difficulty in recognizing display with visual notification using an LCD, an LED, or the like.

(3) If notification is performed by using a clicking sound, a louder sound should be made to notify a player in a wider range of activity, which interferes with the recognition of a sound made by the player. In addition, the propagation time of a sound differs depending on the positional relationship between the main body of a metronome and a player. As the distance therebetween is larger, the difference in propagation time becomes more pronounced to a degree that synchronized beat indication cannot be provided to all the players any more.

The method disclosed in JP 2001-154672 A enables simultaneous notification of beats at a steady tempo to a plurality of players, but still has the following problems.

(1) The method is incapable of displaying beats when the tempo is to be varied freely in tune with a melody or for performance expression. It is operationally possible to change the tempo for each piece of music but the method cannot handle the situation in which the conductor of an orchestra is attempting to subtly vary the tempo to express the mood of a music piece being played.

(2) If a music piece being played has an odd meter and notification of downbeats and upbeats is made with a regular meter, the relationship between the downbeats and the upbeats is disordered in a measure with the odd meter.

(3) If a plurality of players use the function of synchronized beat notification, the procedure of calling a communication partner, establishing a communicational relation therewith, and further selecting a special mode on a communication apparatus in use is necessary so that the use of the function by a large number of players entails intricacy.

(4) Even if beat notifying means is provided for every one of players on a one-by-one basis, it is difficult to place a beat notification system within sight of every one of the players when the players are moving hard on land or in water.

(5) Even if beat notifying means is provided for every one of players on a one-by-one basis, it is hard for the player to recognize aural beat notification in a noisy situation or in water.

(6) The use of the system in water has not been considered in the first place.

SUMMARY OF THE INVENTION

The present invention has been achieved in view of the foregoing problems and it is therefore an object of the present invention to provide a synchronized beat notification system which easily and reliably performs simultaneous notification of beats arbitrarily indicated by a conductor to a plurality of players on land or in water.

To solve the foregoing problems, the present invention has adopted the following means.

The gist of the present invention lies in the construction of a synchronized beat notification system which radio-transmits, to a slave device, a beat signal indicated with arbitrary timing by the user by using a master device, and performs notification of beat indication by using the slave device that has received the signal, to thereby simultaneously notify a plurality of players of the beat arbitrarily indicated by the user.

According to the present invention, a synchronized beat notification system includes:

a beat input unit to which a user inputs a beat with arbitrary timing;

a master radio communication unit for transmitting, as radio information, the beat inputted to the input unit;

a master device composed of a master housing containing therein the beat input unit and the master radio communication unit;

a slave radio communication unit for receiving the information transmitted from the master radio communication unit;

a beat notification unit for performing notification of the beat in accordance with the information received by the slave radio communication unit; and a slave device composed of a slave housing containing therein the slave radio communication unit and the beat notification unit.

In the synchronized beat notification system according to the present invention, the beat input unit is composed of at least one switch.

In the synchronized beat notification system according to the present invention, the beat input unit discriminates an output of a pressure sensor by using at least one comparator and distinctively outputs two types of events of inputting of a downbeat and inputting of an upbeat.

In the synchronized beat notification system according to the present invention, the master radio communication unit adds ID information on the master device to a signal indicative of the beat and transmits the signal with the added ID information.

In the synchronized beat notification system according to the present invention, the slave radio communication unit extracts ID information on a transmitter from the received information and informs the beat notification unit of beat indication only when the extracted ID information coincides with ID information on a master device intended to become a communication partner.

In the synchronized beat notification system according to the present invention, the beat notification unit performs notification of beat indication with LCD display.

In the synchronized beat notification system according to the present invention, the beat notification unit performs notification of beat indication with LED display.

In the synchronized beat notification system according to the present invention, the beat notification unit performs notification of beat indication with sound.

In the synchronized beat notification system according to the present invention, the beat notification unit performs notification of beat indication with bodily-sensational expression.

In the synchronized beat notification system according to the present invention, the beat notification unit has a volume for adjusting a strength of expression.

In the synchronized beat notification system according to the present invention, each of the master housing and the slave housing has resistance to water.

In the synchronized beat notification system according to the present invention, the master device is composed of: the beat input unit to which the user inputs the beat with arbitrary timing; a predetermined-cycle beat generator for predetermining a cycle in which beat indication timing is provided and indicating starting and stopping of beat generation; the master radio communication unit for radio-transmitting a fact that beat generation is indicated in the beat input unit and in the predetermined-cycle beat generator; and the master housing containing therein the beat input unit, the predetermined-cycle beat generator, the master radio communication unit, and the beat generation display unit.

In the synchronized beat notification system according to the present invention, the master device is composed of: the beat input unit to which the user inputs the beat with arbitrary timing; a predetermined-cycle beat generator for predetermining a cycle in which beat indication timing is provided and indicating starting and stopping of beat generation; the master radio communication unit for radio-transmitting a fact that beat generation is indicated in the beat input unit and in the predetermined-cycle beat generator; a beat generation display unit for displaying that beat generation is indicated in the beat input unit and in the predetermined-cycle beat generator; and the master housing containing therein the beat input unit, the predetermined-cycle beat generator, the master radio communication unit, and the beat generation display unit.

In the synchronized beat notification system according to the present invention, the slave device is composed of: the slave radio communication unit for receiving the information transmitted from the master radio communication unit; a slave predetermined-cycle beat generation indicator for predetermining a cycle in which beat generation timing is provided and indicating starting and stopping of beat generation; the beat notification unit for performing notification of a fact that beat indication is performed by the slave radio communication unit and by the slave predetermined-cycle beat generation indicator upon receipt of the fact; and the slave housing containing therein the slave radio communication unit, the slave predetermined-cycle beat generation indicator, and the beat notification unit.

DETAILED DESCRIPTION OF THE PREFERRED EMBODIMENTS

Figure 1:
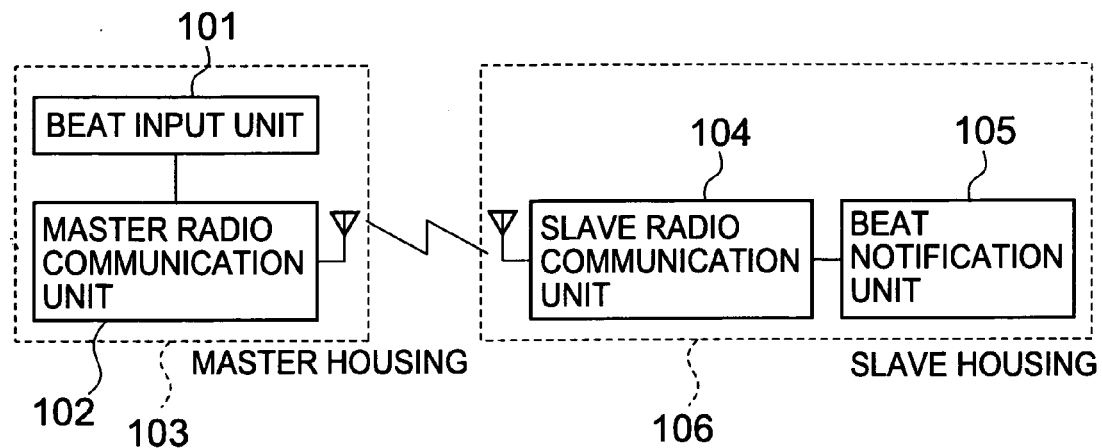
FIG. 1 is a block diagram of a synchronized beat notification system according to the present invention.

Referring now to the drawings, embodiments of the present invention will be described hereinbelow.

FIG. 1 is a block diagram of a synchronized beat notification system according to the present invention. A conductor indicates beats by using a beat input unit 101. In this case, the conductor indicates beats to players with an arbitrary timing in such a manner as to wave a baton or keep the tempo by clapping. When the beats are indicated, the event of beat indication is converted on a beat-by-beat basis to radio information in a master radio communication unit 102 and radio-transferred to another unit. The beat input unit 101 and the master radio communication unit 102 are contained in a master housing 103 to constitute a master device. The radio information transmitted from the master radio communication unit 102 is received by a slave radio communication unit 104. The slave radio communication unit 104 extracts beat information from the received information and requests a beat notification unit 105 to display beat indication in accordance with the result. The beat notification unit 105 displays beat indication by a visual display method, an aural display method, a bodily-sensational expression method such as a stimulation of skin, or a combination of the foregoing display methods. The slave radio communication unit 104 and the beat notification unit 105 are contained in a slave housing 106 to constitute a slave device.

By providing the beat input unit 101 with a plurality of input means such as switches, it becomes possible not only to simply keep cycles but also to indicate strong and weak rhythmic beats. By selectively operating, e.g., two switches for inputting downbeats and for inputting upbeats in tune with a desired rhythm, a rhythmic pattern for a march formed of down-, up-, down-, and up-beats or a rhythmic pattern for a waltz formed of down-, up-, and up-beats can be indicated simultaneously with the tempo. In addition, the use of a pressure sensor such as a piezoelectric element for the beat input unit 101 allows the indication of the tempo and the strong and weak rhythmic beats in accordance with a simple and easy method such as an application of impacts with different strengths only to a single point.

Figure 2:
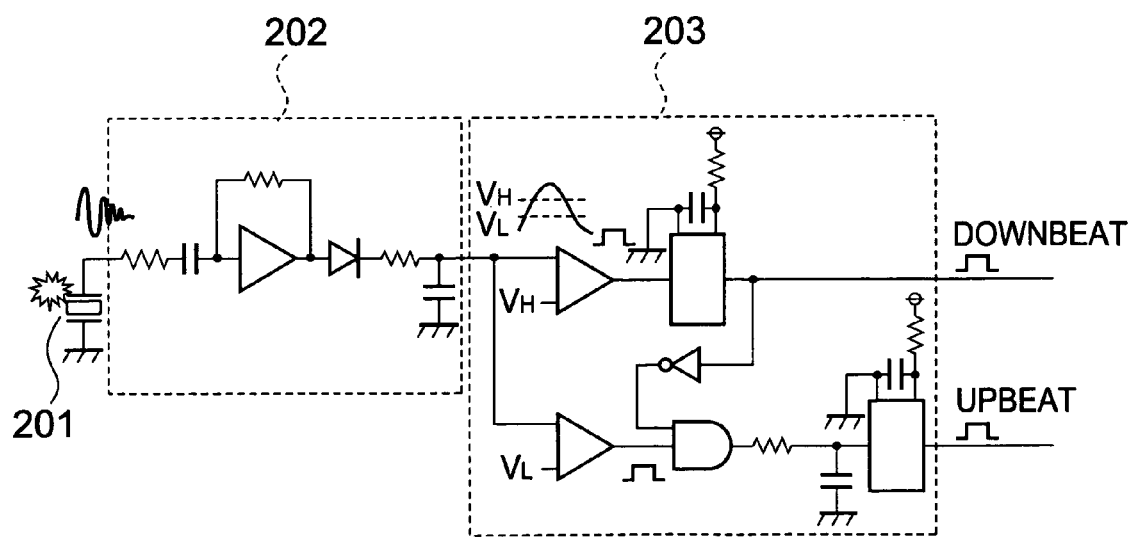
FIG. 2 is a view showing an example of a beat input unit in the synchronized beat notification system according to the present invention, which is composed of a pressure sensor, a waveform shaping circuit, and a waveheight discriminating circuit.

As shown in FIG. 2, an electromotive voltage generated upon a distortion of the pressure sensor 201 under the impacts applied thereto is inputted to a waveform shaping circuit 202. The waveform shaping circuit 202 having a configuration in which a differentiating circuit and an integrating circuit are connected in cascade has been adjusted to output, in response to one impact, one pulse signal with a waveheight directly proportional to the strength of the impact.

The pulse signal outputted from the waveform shaping circuit 202 is inputted to a waveheight discrimination circuit 203. In the waveheight discrimination circuit 203, a comparator compares the waveheight of the pulse signal with a set reference voltage value VL. Only when a pulse signal with a waveheight not less than the reference voltage value VL is inputted, the input is judged to be valid, whereby a lower limit value of the impacts applied to the pressure sensor 201 upon beat indication is determined. Another comparator in the waveheight discrimination circuit 203 compares the waveheight of the inputted pulse signal with a reference voltage value VH and judges that a downbeat is indicated when a pulse signal with a waveheight not less than the reference voltage value VH is inputted, while judging that an upbeat is indicated when a pulse signal with a waveheight value not less than the reference voltage VL and less than the reference voltage value VH is inputted. When the downbeat and the upbeat are thus discriminated in the waveheight discrimination circuit 203, a pulse signal reflecting the result of the discrimination is outputted from a one-shot pulse generator.

Figure 3:
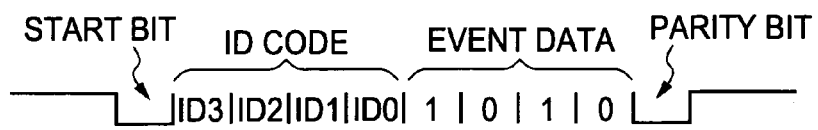
FIG. 3 is a view showing an example of information transmitted from a master radio communication unit in the synchronized beat notification system according to the present invention.
Figure 4:
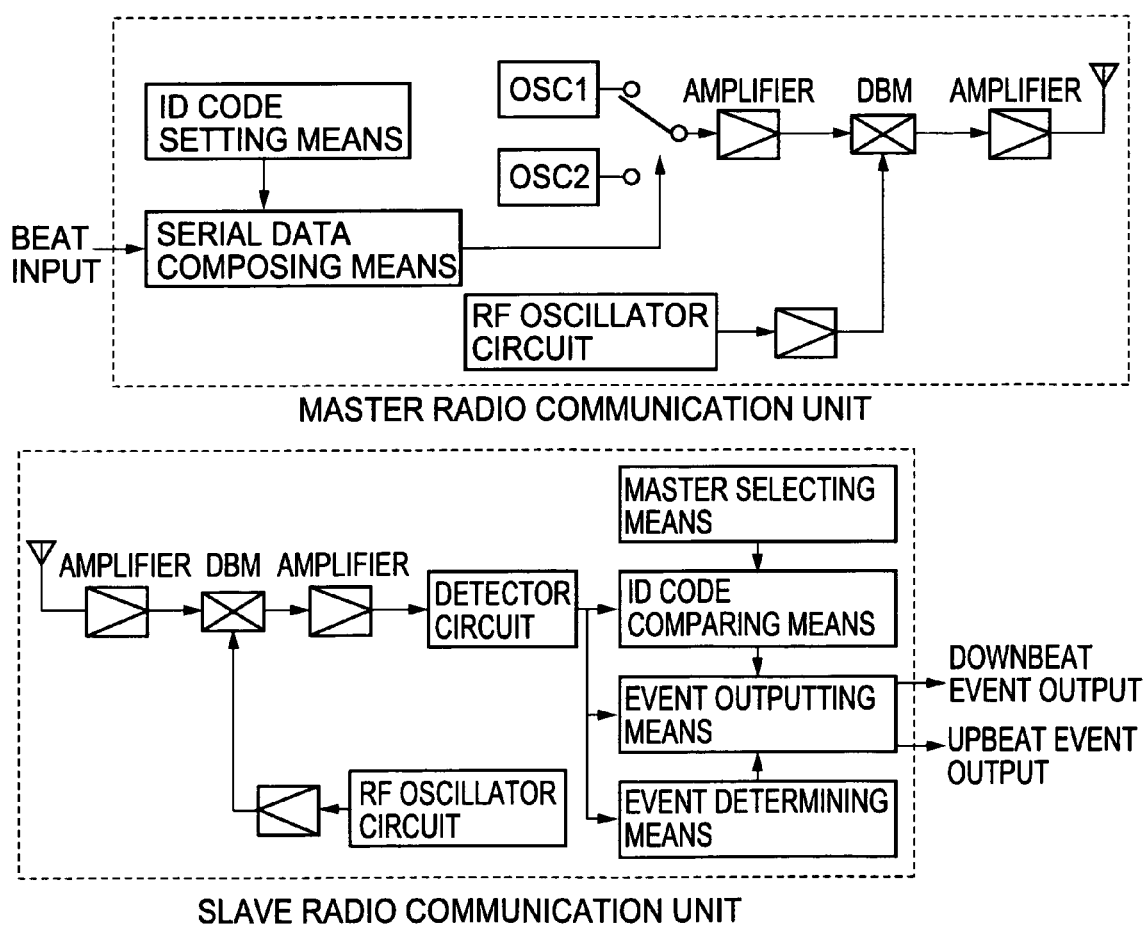
FIG. 4 is a schematic block diagram of the master radio communication unit and a slave radio communication unit in the synchronized beat notification system according to the present invention.

Subsequently, the downbeat or upbeat indicated by using the beat input unit 101 is converted to radio information in the master radio communication unit 102. Representatives of information transmitted between the master device and the slave device are a downbeat event and an upbeat event. To positively and reliably implement an exchange of the information, it is effective to determine a communication protocol between the master device and the slave device. The synchronized beat notification system according to the present invention assumes a presence of a plurality of master devices or slave devices so that a situation in which players selects a desired one from among a plurality of conductors and follows his or her direction can be also handled. For this purpose, the master radio communication unit 102 has means for setting the ID code of the master device to which it belongs and the slave radio communication unit 104 has master device selecting means. Specific examples of the master ID code setting means and the master device selecting means that can be used include one using a dial encode switch, a bit switch, or the like and input operational means composed of a combination of an LCD display, a personal computer IC, a memory element, and an operational switch. In transmitting event information on the beat, the master device adds the ID code information set for itself to the information to be transmitted, thereby composing serial data in accordance with the communication protocol determined between the master device and the slave device. FIG. 3 shows an example of the serial data. As the transmission method, any radio data transmission method can be adopted. However, if a radio transmission method using an extremely weak radio wave is adopted, for instance, a hardware configuration is on a proper scale and performance requirements in accordance with the modes in which the present invention is used are satisfied appropriately. Needless to say, as shown in FIG. 4, that typical components required to transmit extremely weak radio signals, such as an RF oscillator circuit, a DBM (Double Balanced Mixer), an amplifier, and an antenna, are contained in the master radio communication unit 102. The slave radio communication unit 104 also contains typical components required to receive extremely weak radio signals. In order to select information only from a desired master device from received information, the slave radio communication unit 104 is composed of the master selecting means, ID code comparing means, event determining means, and event outputting means connected to the ID code comparing means and to the event determining means to receive information from a detector circuit and output a downbeat event output or an upbeat event output to the beat notification unit 105.

As specific methods for beat notification, there can be considered several types including display using visual means, aural display, and bodily-sensational expression such as a stimulation of the skin. Depending on a situation under which the synchronized beat notification system according to the present invention is used, any of those display methods or a combination thereof can be used selectively.

Figure 5:
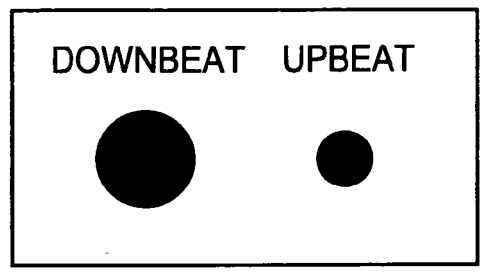
FIG. 5 shows an example of a beat notification unit in the synchronized beat notification system according to the present invention, which is implemented by display using an LCD.
Figure 6:
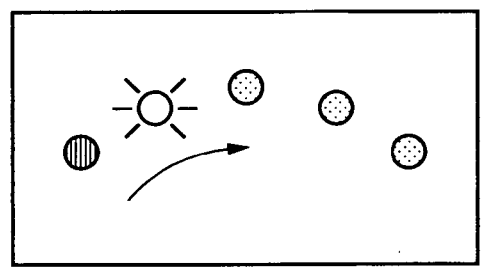
FIG. 6 shows an example of the beat notification unit in the synchronized beat notification system according to the present invention, which is implemented by display using an LED.

As a visual display method, as shown in FIG. 5, display using an LCD can be considered. In response to the indication of a downbeat, a larger circular segment flashes, while a smaller circular segment flashes in response to the indication of an upbeat. Since the display using an LCD is highly flexible in determining a design pattern and allows suppression of power consumption to a relatively low level, it is suitable for use in a small-size battery-driven device. Display using an LED allows not only distinct display of a downbeat and an upbeat through the flashing operations of respective LEDs corresponding to the downbeat and the upbeat but also, as shown in FIG. 6, even beat-to-beat transient expression by using a method in which a plurality of LEDs are arranged on a line and the LEDs are turned on successively. It is also possible to use LEDs emitting light beams in a plurality of colors and distinctively represent the downbeat and the upbeat. An LED is excellent in visible recognition particularly when used in a dark environment.

Aural display is a method which displays a downbeat or an upbeat by using a sound in a tone corresponding thereto through a vibration of a sound generator such as a speaker. Aural display can be used even when the slave device is not necessarily placed within a sight of a player. The difference between the downbeat and the upbeat can be expressed not only by using different tones but also using different frequencies, i.e., heights of the sounds or different sound pressures, i.e., magnitudes of the sounds.

Figure 7:
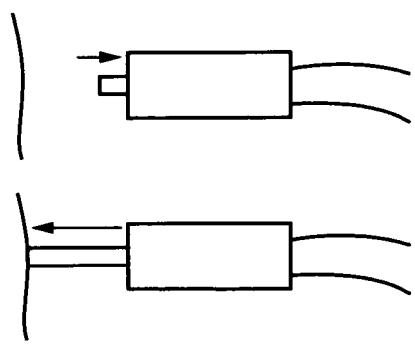
FIG. 7 shows an example of the beat notification unit in the synchronized beat notification system according to the present invention, which is implemented by a bodily-sensational method using an electromagnetic actuator or the like to lightly tap on the skin of a player with a stick-shaped solid.
Figure 8:
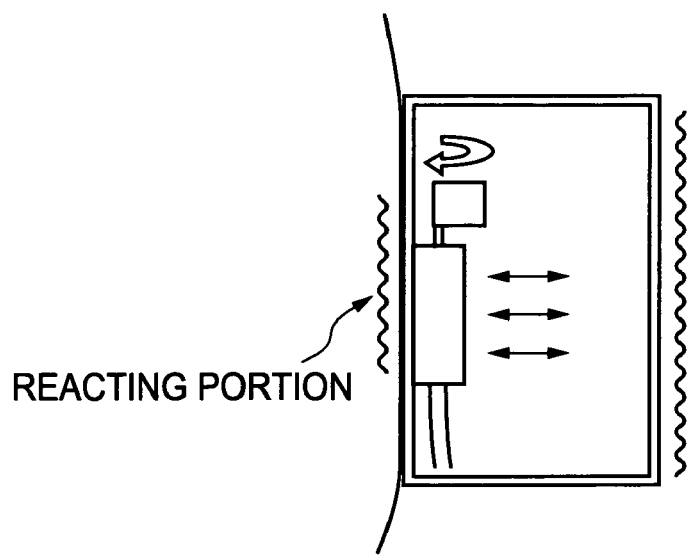
FIG. 8 shows an example of the beat notification unit in the synchronized beat notification system according to the present invention, which is implemented by a bodily-sensational method using a vibratory sensation produced by a vibration motor.

Bodily-sensational expression method is a display method which performs beat notification by adding any stimulation to the skin of a player. As specific means for implementing the bodily-sensational expression, as shown in FIG. 7, there can be used a method which lightly taps on the skin of the player with a stick-shaped solid using an electromagnetic actuator or the like, or as shown in FIG. 8, there can be used a method which rotates, for a given period of time, a vibration motor having an eccentric cone attached to the shaft thereof and provided in a reactive portion which comes in contact with the body of the player in accordance with the timing for beat notification to produce a vibratory sensation. In the case of using the electromagnetic actuator, distinctive display of the downbeat or the upbeat is implemented by adjusting an excitation current in a coil for the actuator and varying the speed of movement of the stick-shaped solid. In the case of using the vibration motor, an intensity of the vibratory sensation can be controlled by varying a driving current for the motor, i.e., by varying the speed of rotation of the motor. The downbeat or the upbeat can also be expressed distinctively by increasing or reducing the time of rotation of the motor. In accordance with the bodily-sensational expression method, the beat can be recognized irrespective of a change in the sight of the player and without being disturbed by noise even in a noisy situation. In addition, the bodily-sensational expression method can also be used without affecting other nearby players.

The degrees of display can be set to proper levels which vary depending on the environment or situations under which the synchronized beat notification system according to the present invention is used, the sense of the player, or the like, which is common to any of the cases where the foregoing display methods are used. Accordingly, each display means can be adjusted with a volume control provided therein to adjust the degree of the display (i.e., a strength of the beat notification) such that the player receives a proper level of stimulation. In the case of using an LED, the value of a current allowed to flow in the LED is adjusted with the volume. In the case of aural display, the value of a current allowed to flow in the speaker is adjusted with the volume. In the case of bodily-sensational expression the value of a current allowed to flow in the coil for the actuator or in the vibration motor is adjusted with the volume.

By forming each of the master housing 103 and the slave housing 106 of a material which is low in moisture absorption (i.e., a waterproof material) such as a resin, it is possible to impart water resistance to the master device and to the slave device and render them waterproof for use in water. If two or more parts are combined to compose each of the housings, these parts are fit together via a packing material. A waterproof treatment is also performed using a gasket and the like with respect to the portion of the input means, such as a switch, in the beat input unit 101. For valid visual display, the slave housing 106 has at least the display portion thereof composed of a transparent resin or glass and is formed to have a light weight for the improved effect of bodily-sensational expression.

Figure 9:
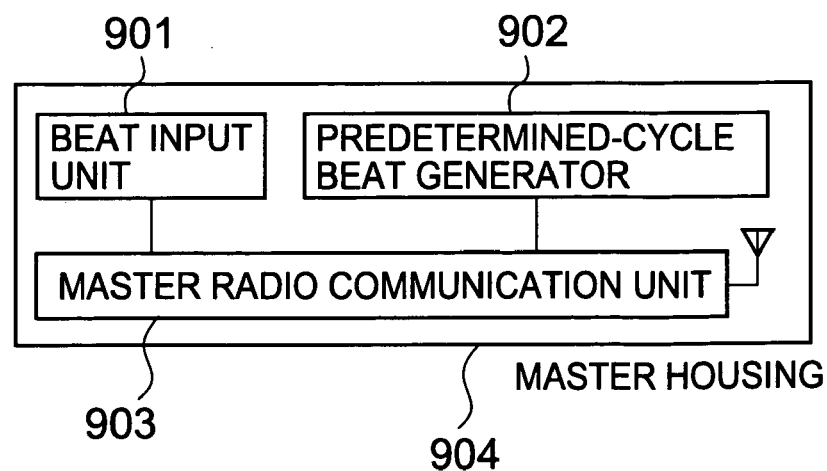
FIG. 9 shows a structure in which a master device in the synchronized beat notification system according to the present invention contains a predetermined-cycle beat generator.
Figure 10:
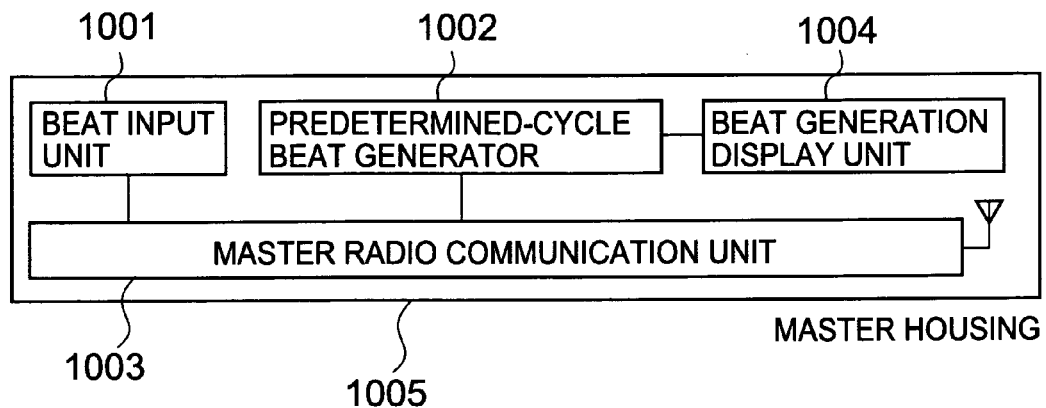
FIG. 10 shows a structure in which the master device in the synchronized beat notification system according to the present invention includes a beat generation display unit.

As shown in FIG. 9, the master device can also be constructed to have a predetermined-cycle beat generator 902 for predetermining a cycle in which beat indication timing is provided and indicating the starting and stopping of beat generation in addition to the beat input unit 901 with which the user indicates a beat with an arbitrary timing. As shown in FIG. 10, the master device also has a beat generation display unit 1004 for displaying that beat generation is indicated when the predetermined-cycle beat generator 102 is generating a beat. The beat generation display unit 1004 is implemented by visual display, aural display, bodily-sensational expression, or an arbitrary combination thereof, similarly to the means used in the beat notification unit 105.

Figure 11:
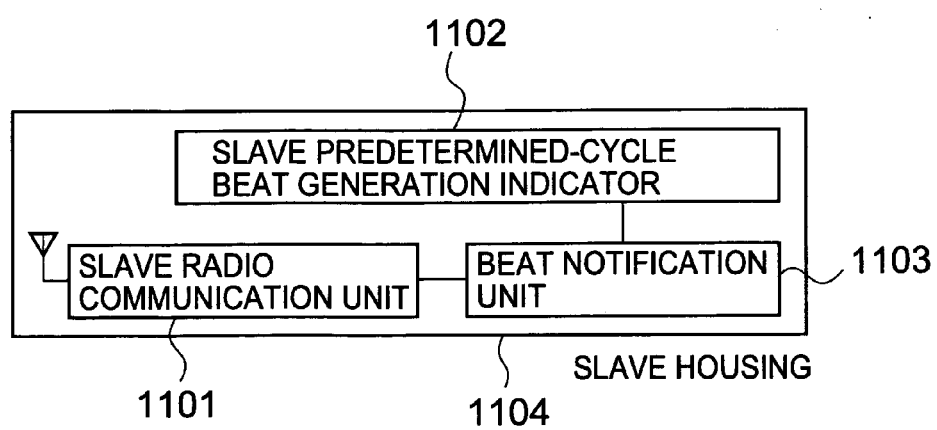
FIG. 11 shows a structure in which a slave device in the synchronized beat notification system according to the present invention includes a slave predetermined-cycle beat generation indicator.

As shown in FIG. 11, the slave device has a slave predetermined-cycle beat generation indicator 1102 for predetermining a cycle in which beat indication timing is provided even if the slave device is used alone and indicating the starting and stopping of beat generation. The slave device can also be constructed to perform beat notification by visual display, aural display, bodily-sensational expression, or the like by using the beat notification unit 1103.

A description will be given of the function of this embodiment.

When the user indicates a beat with an arbitrary timing by using the beat input unit of the master device, the beat indication is radio-transmitted to the slave device. Since the transmitted beat indication is displayed on the beat notification unit of the slave device, the beat indication by the user of the master device, i.e., a conductor is displayed in real time on each of slave devices as communication partners.

When the conductor distinctively inputs the upbeat or downbeat by using one or more switches, notification of the downbeat or the upbeat is distinctively performed by the slave device.

If a pressure sensor is used in the beat input unit, the slave device distinctively performs the notification of the downbeat or the upbeat in accordance with the strength of an impact applied to the input unit. The master device adds the ID information on itself to the event information on the indication of the downbeat or upbeat and radio-transmits the event information with the added ID information. The slave device extracts the ID information on the transmitter from the received information and displays beat indication on the beat notification unit only when the extracted ID information coincides with ID information on a master device predetermined as or intended to become a communication partner. This defines the correspondence between the conductor and the receiver of his or her indication.

The beat notification unit implements beat indication by any of visual display such as LCD display or LED display, aural display, bodily-sensational expression, and an arbitrary combination thereof. The degree of display is adjusted by using a volume. The synchronized beat notification system according to this embodiment has resistance to water.

By predetermining a desired cycle and indicating the starting and stopping of beat generation by using the master device, simultaneous beat indication to a plurality of slave devices can be performed with a timing provided in the predetermined cycle. At that time, the beat indicated in the predetermined-cycle is displayed on the master device to be checked.

Even in the case where the slave device is used alone, if a desired cycle is predetermined and the starting and stopping of a beat generation is indicated, the slave device performs the visual display, aural display, bodily-sensational expression, or the like of the beat with a timing provided in the predetermined cycle.

As described above, the present invention has a construction in which the synchronized beat notification system includes: the beat input unit to which a user inputs a beat with an arbitrary timing; the master radio communication unit for transmitting, as radio information, the beat inputted to the input unit; the master device composed of the master housing containing therein the beat input unit and the master radio communication unit; the slave radio communication unit for receiving the information transmitted from the master radio communication unit; the beat notification unit for performing notification of the beat in accordance with the information received by the slave radio communication unit; and the slave device composed of the slave housing containing therein the slave radio communication unit and the beat notification unit. This allows simultaneous notification of beats at an arbitrary tempo which are indicated by a conductor to a plurality of players.

The present invention is also constructed such that the beat input unit is composed of one or more switches, and alternatively, the beat input unit discriminates an output of a pressure sensor by using one or more comparators and distinctively outputs two types of events of inputting of a downbeat and inputting of an upbeat. The arrangement allows simultaneously notification of downbeats and upbeats at an arbitrary tempo which are indicated distinctively by the conductor to the plurality of players.

The present invention is also constructed such that the master radio communication unit adds ID information on the master device to a signal indicative of the beat and transmits the signal with the added ID information, while the slave radio communication unit extracts ID information on a transmitter from the received information and informs the beat notification unit of beat indication only when the extracted ID information coincides with ID information on a master device intended to become a communication partner. The arrangement allows an easy establishment of the correspondence between the conductor and the receiver of his or her indication.

The present invention is also constructed such that the beat notification unit is implemented by any of visual display such as LCD display or LED display, aural display, bodily-sensational expression of those display means, and arbitrary combination thereof, that the beat notification unit has a volume for adjusting a strength of expression, and that each of the master housing and the slave housing has resistance to water. The arrangement allows a reliable and precise recognition of beats in various situations in which: music is played together by a large number of musicians; players are moving in a marching band; synchronized swimmers are playing, and the like.

The present invention is also constructed such that the master device is composed of the beat input unit to which the user inputs the beat with an arbitrary timing, a predetermined-cycle beat generator for predetermining a cycle in which beat indication timing is provided and indicating the starting and stopping of the beat generation, the master radio communication unit for radio-transmitting a fact that the beat generation is indicated in the beat input unit and in the predetermined-cycle beat generator, a beat generation display unit for displaying that the beat generation is indicated in the beat input unit and in the predetermined-cycle beat generator, and the master housing containing therein the beat input unit, the predetermined-cycle beat generator, the master radio communication unit, and the beat generation display unit. The arrangement allows a conductor to simultaneously notify a plurality of players of beats with a timing provided in a predetermined cycle. In addition, the beats indicated in the predetermined cycle can be displayed on the master device to be checked.

The present invention is also constructed such that the slave device is composed of the slave radio communication unit for receiving the information transmitted from the master radio communication unit, a slave predetermined-cycle beat generation indicator for predetermining a cycle in which beat generation timing is provided and indicating the starting and stopping of the beat generation, the beat notification unit for performing notification of a fact that the beat indication is performed by the slave radio communication unit and by the slave predetermined-cycle beat generation indicator upon receipt of the fact, and the slave housing containing therein the slave radio communication unit, the slave predetermined-cycle beat generation indicator, and the beat notification unit, Even in the case where the slave device is used alone, if a desired cycle is predetermined and the starting and stopping of the beat generation is indicated, the slave device is allowed to perform the visual display, aural display, bodily-sensational expression, or the like of the beats with a timing provided in the predetermined-cycle.

What is claimed is:

1. A synchronized beat notification system for providing beat notifications to a plurality of users participating in synchronization with a common rhythm, the synchronized beat notification system comprising:

a master device comprised of a beat input unit to which a user inputs a beat with arbitrary timing, a master radio communication unit for transmitting as radio information the beat inputted to the beat input unit together with identification information corresponding to information identifying the master device, and a master housing containing therein the beat input unit and the master radio communication unit; and a slave device comprised of a slave radio communication unit for receiving the radio information transmitted from the master radio communication unit of the master device, a beat notification unit for performing notification of the beat inputted to the beat input unit of the master device in accordance with the information received by the slave radio communication unit, and a slave housing containing therein the slave radio communication unit and the beat notification unit, the slave radio communication unit extracting from the received radio information the identification information corresponding to the master device and controlling the beat notification unit to perform beat notification only when the extracted identification information coincides with identification information on a master device intended to become a communication partner with the slave device.

2. A synchronized beat notification system according to claim 1; wherein the beat input unit of the master device comprises at least one switch.

3. A synchronized beat notification system according to claim 1; wherein the beat input unit comprises a pressure sensor and at least one comparator for discriminating an output of the pressure sensor to thereby output two types of events corresponding to the input of a downbeat and the input of an upbeat.

4. A synchronized beat notification system according to claim 1; wherein the beat notification unit of the slave device comprises an LCD display; and wherein the beat notification unit performs notification of the beat by displaying the beat with the LCD display.

5. A synchronized beat notification system according to claim 1; wherein the beat notification unit of the slave device comprises an LED display; and wherein the beat notification unit performs notification of the beat by displaying the beat with the LED display.

6. A synchronized beat notification system according to claim 1; wherein the beat notification unit of the slave device comprises a sound generating device for generating a sound; and wherein the beat notification unit performs notification of the beat by generation of a sound by the sound generation device.

7. A synchronized beat notification system according to claim 1; wherein the beat notification unit of the slave device comprises a generating device for generating a bodily-sensational expression; and wherein the beat notification unit performs notification of the beat by generation of a bodily-sensational expression by the generating device.

8. A synchronized beat notification system according to claim 1; wherein the beat notification unit comprises means for adjusting a strength of the beat notification.

9. A synchronized beat notification system according to claim 1; wherein each of the master housing and the slave housing is made of a material resistant to water.

10. A synchronized beat notification system according to claim 1; wherein the master device further comprises a predetermined-cycle beat generator disposed in the master housing for generating a predetermined timing cycle for beat notification and for indicating starting and stopping of beat generation; and wherein the master radio communication unit of the master device transmits by radio signal information indicating that a beat is inputted to the beat input unit and that the starting and stopping of beat generation is indicated by the predetermined-cycle beat generator.

11. A synchronized beat notification system according to claim 1; wherein the master device further comprises a predetermined-cycle beat generator disposed in the master housing for generating a predetermined timing cycle for beat notification and for indicating starting and stopping of beat generation, the master radio communication unit of the master device transmitting by radio signal information indicating that a beat is inputted to the beat input unit and that the starting and stopping of beat generation is indicated by the predetermined-cycle beat generator; and a beat generation display unit disposed in the master housing for displaying the information transmitted by the master radio communication unit and corresponding to the beat inputted to the beat input unit and the starting and stopping of beat generation indicated by the predetermined-cycle beat generator.

12. A synchronized beat notification system according to claim 1; wherein the slave device further comprises a slave predetermined-cycle beat generation indicator disposed in the slave housing for generating a predetermined timing cycle for beat notification and for indicating starting and stopping of beat generation; wherein the beat notification unit performs notification of information informing that beat indication is performed by the slave radio communication unit and that the slave predetermined-cycle beat generation indicator indicates starting and stopping of beat generation.

13. A master device for a synchronized beat notification system for providing synchronized beat notification through slave devices to a plurality of users having the respective slave devices and participating in synchronization with a common rhythm, the master device comprising:
a beat input unit to which a user inputs a beat with arbitrary timing;
a master radio communication unit for transmitting, as radio information, to the slave devices the beat inputted to the beat input unit together with identification information corresponding to information identifying the master device; and
a master housing containing therein the beat input unit and the master radio communication unit.

14. A master device according to claim 13; wherein the master housing is made of a waterproof material.

15. A system of slave devices for providing synchronized beat notification transmitted by a master device to a plurality of users having the respective slave devices and participating in synchronization with a common rhythm, each of the slave devices comprising:
a slave radio communication unit for receiving information corresponding to the synchronized beat notification transmitted by the master device and including identification information corresponding to information identifying the master device;
a beat notification unit for performing notification of a beat to the user in accordance with the synchronized beat notification received by the slave radio communication unit, the slave radio communication unit extracting the identification information from the received information and controlling the beat notification unit to perform beat notification only when the extracted identification information coincides with identification information on a master device intended to become a communication partner with the slave device; and
a slave housing containing therein the slave radio communication unit and the beat notification unit.

16. A system of slave devices according to claim 15; wherein each slave housing is made of a waterproof material.

17. A synchronized beat notification system for providing beat notifications to a plurality of users participating in synchronization with a common rhythm, the synchronized beat notification system comprising:
a plurality of master devices each comprised of a beat input unit to which a user inputs a beat with arbitrary timing, a master radio communication unit for transmitting as radio information the beat inputted to the beat input unit together with identification information corresponding to information identifying the master device, and a master housing containing therein the beat input unit and the master radio communication unit; and
a plurality of slave devices each comprised of a slave radio communication unit for receiving the radio information transmitted from the master radio communication unit of at least one of the master devices, a beat notification unit for performing notification of the beat inputted to the beat input unit of the master device in accordance with the information received by the slave radio communication unit, and a slave housing containing therein the slave radio communication unit and the beat notification unit, the slave radio communication unit extracting from the received radio information the identification information corresponding to the master device and controlling the beat notification unit to perform beat notification only when the extracted identification information coincides with identification information on one of the master devices intended to become a communication partner with the slave device.

18. A synchronized beat notification system according to claim 17; wherein each of the master housing and the slave housing is made of a waterproof material.

* * * * *